United States Patent [19]

Roland

[11] Patent Number: 5,373,501
[45] Date of Patent: Dec. 13, 1994

[54] TELECOMMUNICATIONS SWITCHING NETWORK INCLUDING IMPROVED PORT SELECTOR AND CONTROL CIRCUITRY

[75] Inventor: Kenneth L. Roland, Richmond, Va.

[73] Assignee: C & P of Virginia, Richmond, Va.

[21] Appl. No.: 911,642

[22] Filed: Jul. 10, 1992

[51] Int. Cl.[5] .................... H04M 3/22; H04B 3/46; H04J 3/14

[52] U.S. Cl. .................... 370/13; 371/20.1; 379/12; 379/27

[58] Field of Search .................... 370/13, 13.1, 14, 17; 371/15.1, 16.1, 16.4, 17–19, 20.1; 379/1, 7, 9, 12, 16, 18, 19, 22–24, 27, 29, 34–35; 375/10; 358/139, 406; 341/62

[56] References Cited

U.S. PATENT DOCUMENTS

| | | | |
|---|---|---|---|
| 4,029,913 | 6/1977 | Gunderson | 379/12 |
| 4,076,970 | 2/1978 | Lubarsky, Jr. et al. | 379/27 |
| 4,978,953 | 12/1990 | Hauge | 370/13 |
| 4,996,695 | 2/1991 | Dack et al. | 370/13 |
| 4,998,240 | 3/1991 | Williams | 370/17 |

Primary Examiner—Douglas W. Olms
Assistant Examiner—Hassan Kizou
Attorney, Agent, or Firm—Lowe, Price, LeBlanc & Becker

[57] ABSTRACT

A telecommunications network testing and protocol analyzer arrangement including an improved control and port selecting circuitry which may be provided in the form of a board which plugs into a standard IBM or IBM compatible PC, XT, AT expansion bus (8 bits) and allows for the operate, non-operate control of up to 180 port relays while at the same time providing 8 simultaneous control outputs for other circuit and parameter control functions. All outputs are standard TTL level outputs which may be directly utilized as relay drivers. The selector and control board is controlled by software running under standard PC DOS of MS DOS. The control and selector board may be controlled completely from the computer keyboard as well as from a remote IBM or IBM compatible computer.

25 Claims, 16 Drawing Sheets

NOTE:
1. HIGH OUTPUT FOR NONE OF 30 PORTS SELECTED
2. LOW OUTPUT FOR NONE OF 30 PORTS SELECTED

| CIRCUIT ABBREVIATIONS | |
|---|---|
| U4 | SN74LS04 |
| U5 | SN74LS02 |
| U8 | SN74LS04 |
| U10 | SN74LS04 |
| U11 | SN74LS04 |
| U12 | SN74LS04 |
| U13 | SN74LS04 |
| U14 | SN74LS04 |
| U16 | SN7407 |
| U17 | SN7407 |
| U60 | SN74LS04 |

NOTES

1. OUTPUTS ENABLED (ACTIVE) = 1 (+5V)
   OUTPUTS NOT ENABLED = 0 (0V)

2. ALL SN74LS504'S HAVE PIN 7 GROUNDED AND PIN 14 TO +5V WITH A .01uf. 25V OR HIGHER CAPACITOR ACCROSS PINS 7 AND 14. CAPACITOR # IS THE SAME AS ITS CONNECTED IC: EX. CU15 ACROSS U15

3. HIGH OUTPUT FOR NONE OF 30 PORTS SELECTED

4. LOW OUTPUT FOR NONE OF 30 PORTS SELECTED

Figure 9

SWITH ADDRESS INFORMATION:

The Port Selector Control Board can be used in the IBM or IBM Compatible Computer at the following HEX addresses as long as the addresses are not used by other expansion boards:

>210, 220, 230, 240, 250, 260, 270 (address 200 can be used if no game control adapter is installed in the host or remote IBM or IMB Compatible Computer)
>
>300, 310, 320, 330, 340, 350, 360, 370

To select the following addresses set the address selection switch (SWP1) as follows:

| Address | Position of Address Switch Rockers | |
|---|---|---|
| 200 | 1,2,3,4,5,6 on | none off |
| 210 | 1,3,4,5,6 on | 2 off |
| 220 | 1,2,4,5,6 on | 3 off |
| 230 | 1,4,5,6 on | 2,3 off |
| 240 | 1,2,3,5,6 on | 4 off |
| 250 | 1,3,5,6 on | 2,4 off |
| 260 | 1,4,5,6 on | 2,3 off |
| 270 | 1,5,6 on | 2,3,4 off |
| 300 | 1,2,3,4,5 on | 6 off |
| 310 | 1,3,4,5 on | 2,6 off |
| 320 | 1,2,4,5 on | 3,6 off |
| 330 | 1,4,5 on | 2,3,6 off |
| 340 | 1,2,3,5 on | 4,6 off |
| 350 | 1,3,5 on | 2,4,6 off |
| 360 | 1,4,5 on | 2,3,6 off |
| 370 | 1,5 on | 2,3,4,6 off |

Figure 10

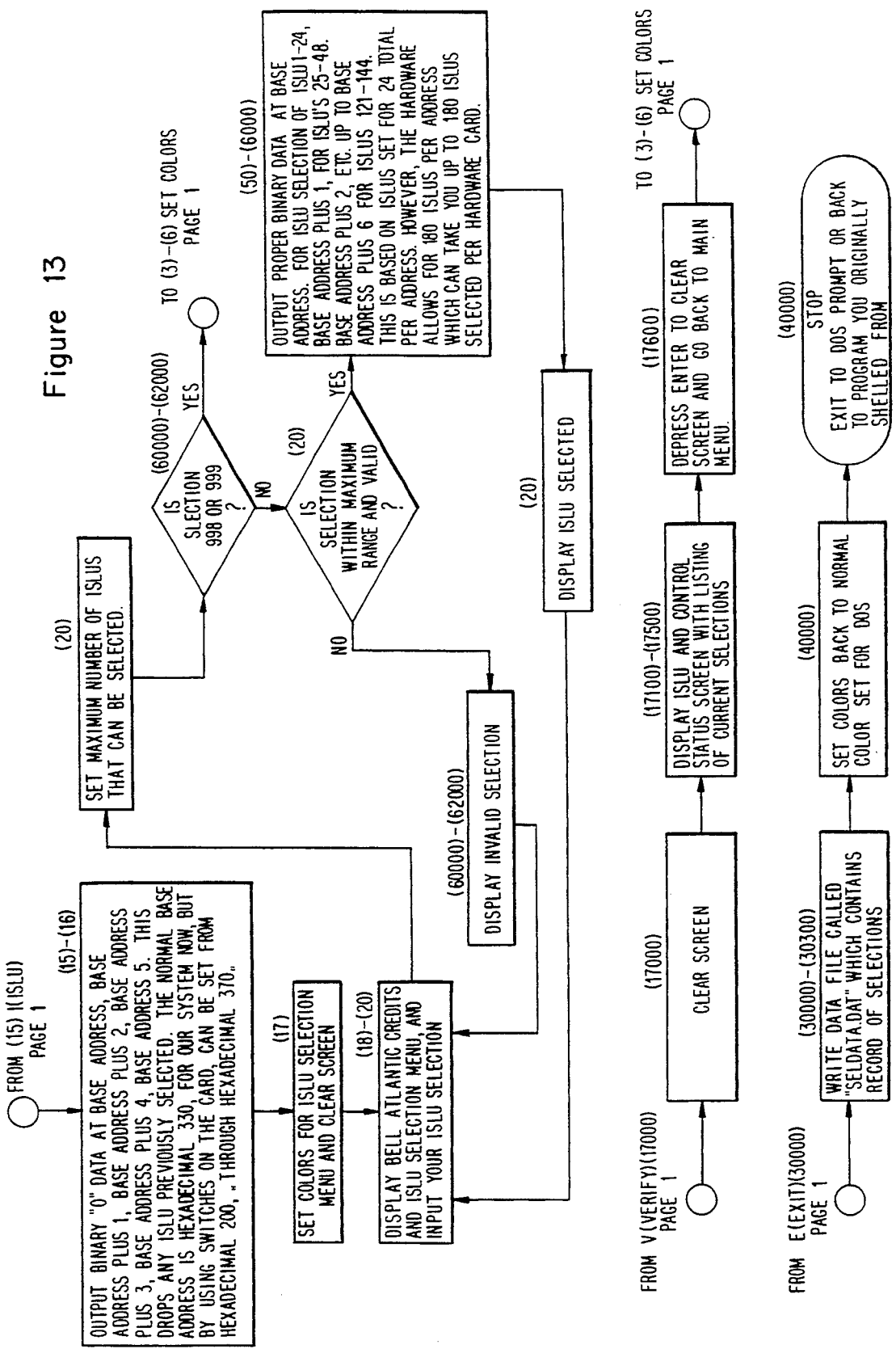

DO YOU WISH TO SELECT THE CONTROL OR ISLU SELECT FUNCTION?

DEPRESS ( C ) FOR CONTROL OR ( I ) FOR ISLU OR ( V ) FOR VIEWING STATUS
( E ) TO EXIT

PLEASE MAKE YOUR SELECTION FOLLOWED BY THE ENTER KEY:

Figure 14

SELECT THE NUMBER OF THE CONTROL FUNCTION FOLLOWED BY THE ENTER KEY:

0. ATT AMI ON D CHANNEL IS THE DEFAULT WITH 0 OR NO SELECTION MADE
1. SELECT ATT AMI PROTOCOL ON B1 CHANNEL
2. SELECT ATT AMI PROTOCOL ON B2 CHANNEL
3. SELECT ATT AMI PROTOCOL ON D CHANNEL WITH REMOTE POWER OVERRIDE
4. SELECT ATT AMI PROTOCOL ON B1 CHANNEL WITH REMOTE POWER OVERRIDE
5. SELECT ATT AMI PROTOCOL ON B2 CHANNEL WITH REMOTE POWER OVERRIDE
6. SELECT 2B1Q PROTOCOL ON D CHANNEL
7. SELECT 2B1Q PROTOCOL ON B1 CHANNEL
8. SELECT 2B1Q PROTOCOL ON B2 CHANNEL
9. SELECT 2B1Q PROTOCOL ON D CHANNEL WITH REMOTE POWER OVERRIDE
10. SELECT 2B1Q PROTOCOL ON B1 CHANNEL WITH REMOTE POWER OVERRIDE
11. SELECT 2B1Q PROTOCOL ON B2 CHANNEL WITH REMOTE POWER OVERRIDE
12. RELEASE ALL CONTROL FUNCTIONS TO DEFAULT VALUES
13. RESET ALL CONTROL AND ISLU'S

ENTER 999 TO EXIT
CONTROL FUNCTION SELECTED IS: DEFAULT - ATT AMI PROTOCOL ON D CHANNEL

Figure 15

ENTER ISLU TO MONITOR (1-24) :3
(OR ENTER 999 TO EXIT)

ISLU NUMBER SELECTED IS 3

Figure 16

ISLU SELECTED IS: 3

CONTROL LAST SELECTED IS: DEFAULT - ATT AMI PROTOCOL ON D CHANNEL

DEPRESS THE ENTER KEY TO RETURN TO THE MAIN MENU:

Figure 17

TELECOMMUNICATIONS SWITCHING NETWORK INCLUDING IMPROVED PORT SELECTOR AND CONTROL CIRCUITRY

CROSS REFERENCES TO RELATED APPLICATIONS

This application is related to co-pending applications Ser. No. 07/515,007 filed Apr. 26, 1990, U.S. Pat. No. 5,189,663; 07/646,319 filed Jan. 28, 1991, U.S. Pat. No. 5,276,529; and U.S. Pat. No. 4,998,240 issued Mar. 5, 1991, all commonly assigned with the present invention.

1. Technical Field

The present invention relates generally to remote testing of a plurality of telecommunications and the like data transfer communication lines, and more particularly to the remote and unattended protocol analysis of data network lines and to the analyzer and related circuitry for effecting such testing and analysis.

2. Background Art

Assignee's U.S. Pat. No. 4,998,240 describes a method and apparatus for remote and unattended testing of customer ISDN lines at an unmanned central office using conventional protocol analyzer equipment. Related application Ser. No. 07/646,319 filed Jan. 28, 1991, describes a system and method for remotely testing a plurality of private data network communication lines using a conventional protocol analyzer. Two commercially available analyzers are the Bell Atlantic Remote ISDN Protocol Analyzer and the Bell Atlantic Test Systems Network Analyzer which facilitates remote monitoring of private line data networks. Said patent and application are incorporated herein by reference.

In the systems described in that patent and pending application the protocol analyzer must have the ability to select from or switch between multiple ports. In the ISDN environment described in U.S. Pat. No. 4,998,240 it is desirable that the equipment has the ability to select 24 relays remotely. In the private line data network environment of application Ser. No. 07/646,319 it is desirable that the device has the capacity to switch more than 24 ports. Previously commercially available controllers customarily have a maximum capacity of 24 ports. All I/O lines to such boards are TTL level compatible and separate relay drivers generally are necessary. Such boards constitute port selectors only and have no ability to control auxiliary circuits or functions.

Using the Bell Atlantic Test Systems Network Analyzer in the private data network environment described in the said 07/646,319 application, customers may quickly identify and resolve troubles in large data networks and remotely monitor the communications protocol of private line data from a remote location. The system allows remote access to multiple RS-232, V.35 or T1 monitor ports for protocol monitoring and performance analysis. By providing remote identification of system troubles, monitoring, and network administration the on-line system eliminates the need to send a technician to the customer's premises on routine trouble calls.

The protocol analyzer in this environment enables testing of multiple lines just minutes after a problem is recognized. The results of these "real time" tests are displayed on the testing equipment, locally, remotely or both. Protocol dumps can be remotely transmitted via facsimile to any location for added technical support. Among the network monitoring capabilities provided are the production of histograms, pie charts and line graphs to give a dynamic picture of data line utilization and transaction response times. Overloaded circuits and equipment can be spotted quickly, and under utilized capability can also be identified and adjusted for more efficient circuit and equipment usage. The protocol analyzer can be configured to fit a wide array of networks. It provides information interfaces to RS-232, V.35, SLC 96, PRI and T1. It can monitor up to 540 RS-232 ports at speeds up to 72 KB. Data can be viewed while the customer is on-line in a real time mode. The data can also be captured in a file for playback at a later time.

The interface to the data network via RS-232 interface is accomplished by placing a RS-232 monitor adaptor in series with the circuit to be monitored. This is a small unit that looks like a standard RS-232 gender changer plug. The monitor adaptor has a monitor port on the side and is then cabled to the monitor port on the network analyzer.

The system is then remotely accessed by another standard DOS based PC running the supplied communications software. This is done via a Dial Up 2400 BAUD built in modem, ISDN line, or any RS-232 Data channel at speeds of up to 56 KB. Upon connection over the remote access channel a password prompt is presented. After entering the proper password, system access is gained. The system can be programmed to drop the data call at this point and call back a predefined phone number in the case of Dial Up operation. After system log in is accomplished the user then selects a port that is associated with the circuit under test. This is done via a menu screen.

After the circuit to be monitored is selected the user then configures the parameters of the circuit under test. The configuration process is done via a menu selection process and is aided by an on screen help system. Various configuration parameter sets can be saved in files and later retrieved via menu when the same circuit is under test again. A configuration set can be assigned to each port and recalled at the time of port selection to ensure that the proper configuration set is used for the circuit under test.

The operator can view data in a real time mode and capture it to the hard drive at the same time for later viewing and analyzation. Various filters can be created to filter out unwanted data to simplify trouble shooting procedures. Traps can also be configured to trigger various events such as the start of capturing of data to the hard disk, or simply to take a snapshot of the data at that time period.

Providing the network operations center with the ability to remotely access any circuit on the network and remotely diagnose the circuit greatly enhances the productivity of the operation and gives greater control over the network. The elimination of costly personnel dispatches to distant locations more than compensates for the cost of the system in a short time span while allowing network operation with minimal circuit down time.

OBJECTS OF THE INVENTION

It is an object of this invention to provide a system for designating from a remote location one of a plurality of user communication lines to be accessed for protocol analysis using apparatus including a combined control and port selector circuitry which provides the capability of handling a large and expandable number of ports in an efficient and economic manner.

It is another object of the invention to provide a system for remote and unattended protocol analysis using protocol analysis circuitry at a site at which a plurality of private line data circuits are interconnected with one or more trunk lines wherein the analysis circuitry is wired into each of the data circuits and trunk lines and a programmed microprocessor is installed at the site for control of the analysis circuitry and selection of the circuit to be tested using an improved control and port selection arrangement.

It is another object of the invention to provide a combined control and port selector for use in a telecommunications network wherein the control and port selector device comprises a circuit board which includes a multiplicity of binary to decimal decoders driven by multiple latch chips which receive a data input from an associated microprocessor under the control of an address decoder connected to the microprocessor address bus, the circuit board including a controller latch responding to a preselected address from the address decoder and data from the microprocessor data bus to configure the parameters of the particular test desired.

It is yet another object of the invention to provide such an improved control and port selector circuit board which may be utilized with existing microprocessor controlled protocol analyzers.

DISCLOSURE OF THE INVENTION

The improved system of the invention integrates into a telecommunications testing network a control and port selection arrangement which may be provided in the form of a board which plugs into a standard IBM or IBM compatible PC, XT, AT expansion bus (8 bits), and allows for the operate, non-operate control of up to 180 port relays used, for example, on private line data circuits. At the same time, it provides 8 simultaneous control outputs for other circuit and parameter control functions. All outputs are standard TTL level outputs which may be directly utilized as relay drivers.

The selector and control board is controlled by software running under standard PC DOS or MS DOS. The control and selector board can be controlled completely from the IBM or IBM compatible computer keyboard. In addition, through the use of commercially available remote software, such as PC-Anywhere, the control and selection board can be controlled from a remote IBM or IBM compatible computer.

The selector and control board is switch address selectable, allowing for the use of multiple control boards in the same IBM or IBM compatible computer. The maximum number of control boards that can be used in one IBM or IBM compatible computer depends upon the number of free expansion slots available in the computer and the number of available expansion slot addresses. In general it is possible to be able to use 4 to 5 of such control boards in any IBM or IBM compatible computer, allowing for the control of up to 900 or more port relays for private line data circuits and up to 40 simultaneous circuit control outputs.

The hardware design of the selector and control board allows for the 8 simultaneous circuit control outputs to be controlled by the software in any combination of outputs 0 through 7 (8 outputs), one at a time or any combination of the 8, including all 8 at one time. The outputs latch to the desired state and will remain in that state until changed by the software or reset by the control output reset (resets all 8 control outputs to logic 0) or by the master selector board reset (resets all board outputs to logic 0).

The software normally allows for only one of the 180 port relay control outputs to be selected at a time. However in modified software form, the hardware design allows the software to select one port relay control output for every 15 outputs. Therefore, up to 12 port relay control outputs may be controlled at the same time.

The hardware design also allows each individual group of 15 port relay control outputs to be converted individually to 4 simultaneous circuit control outputs by unplugging one integrated circuit and plugging in a customer integrated circuit module in its place. In this situation, 15 port relay control outputs are sacrificed to gain 4 simultaneous circuit control outputs. A wide range of flexibility is thus provided.

Further objects and advantages of the invention will become apparent upon reference to the following description, drawings and claims.

BRIEF DESCRIPTION OF THE DRAWINGS

FIG. 9 shows a table of circuit abbreviations identifying IC's and explanations of circled numbers 1-4 in the circuit diagram of FIGS. 3–8.

FIG. 10 illustrates a table of typical addresses and corresponding switch settings for the switch SWP1 in FIG. 3A.

FIGS. 11–13 show a flow diagram of the program for operation of the analyzer and port selection and control means according to the invention.

FIGS. 14–17 show menu screens produced when using the device and program for selecting the circuits to be tested and the parameters of such tests.

BEST MODE FOR CARRYING OUT THE INVENTION

While the invention is applicable to testing and control of ISDN, data, general digital and a wide range of applications, the invention is described in a preferred embodiment in application to private line data network analysis. As described in the above referenced copending application Ser. No. 07/646,319 an analyzer unit is placed at the test site. The user can use the public or private telecommunications system to dial into the unit from any location to remotely access the system and select circuits which it is desired to monitor. Data can be continuously monitored and stored locally as well as remotely. Monitored data can be captured and buffered with subsequent performance of protocol analysis, the analysis data also being stored. Stored data can be transmitted to a remote location.

Figure 1:
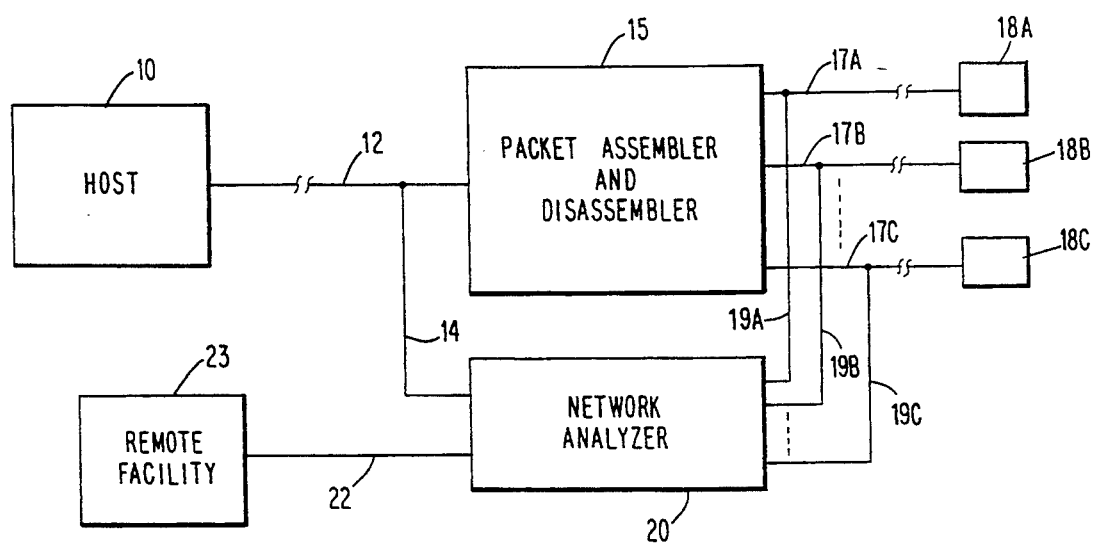
FIG. 1 is a simplified diagram of a multiple circuit private data network provided with on site protocol analysis with telephone dial out capability.

Referring to FIG. 1 there is shown a preferred arrangement. A host 10, which may be an operations center at a headquarters location, is connected to a private line data network by means of a high speed trunk line 12. Line 12 may include one or more individual lines such as commonly used T1, X.25 or X.75 lines. The trunk line is connected to packet assembler and disassembler 15 (PAD) at a remote site. The PAD reroutes packets of data from the trunk line data stream to a plurality of ports to individual data circuits, shown as 18A through 18C, via lines 17A through 17C. While three circuits are represented in the figure, in practice the PAD can handle up to five hundred or more circuits. The system can handle optic fiber lines with appropriate interfacing.

A network analyzer 20 of the type previously described is located at the remote site in close proximity to the PAD and connected in parallel therewith through appropriate interfaces, such as RS232 or V.35 interfaces. Connection to the high speed data link is made by line 14. Lines 19A through 19C represent connections to the data circuits. This connection arrangement makes it possible to monitor any of the circuits at any time. The analyzer is connected to telephone line 22 which enables communication with a distant facility 23. Such feature affords capability of remote supervision and immediate communication of data from the analyzer to the facility at any time.

Figure 2:
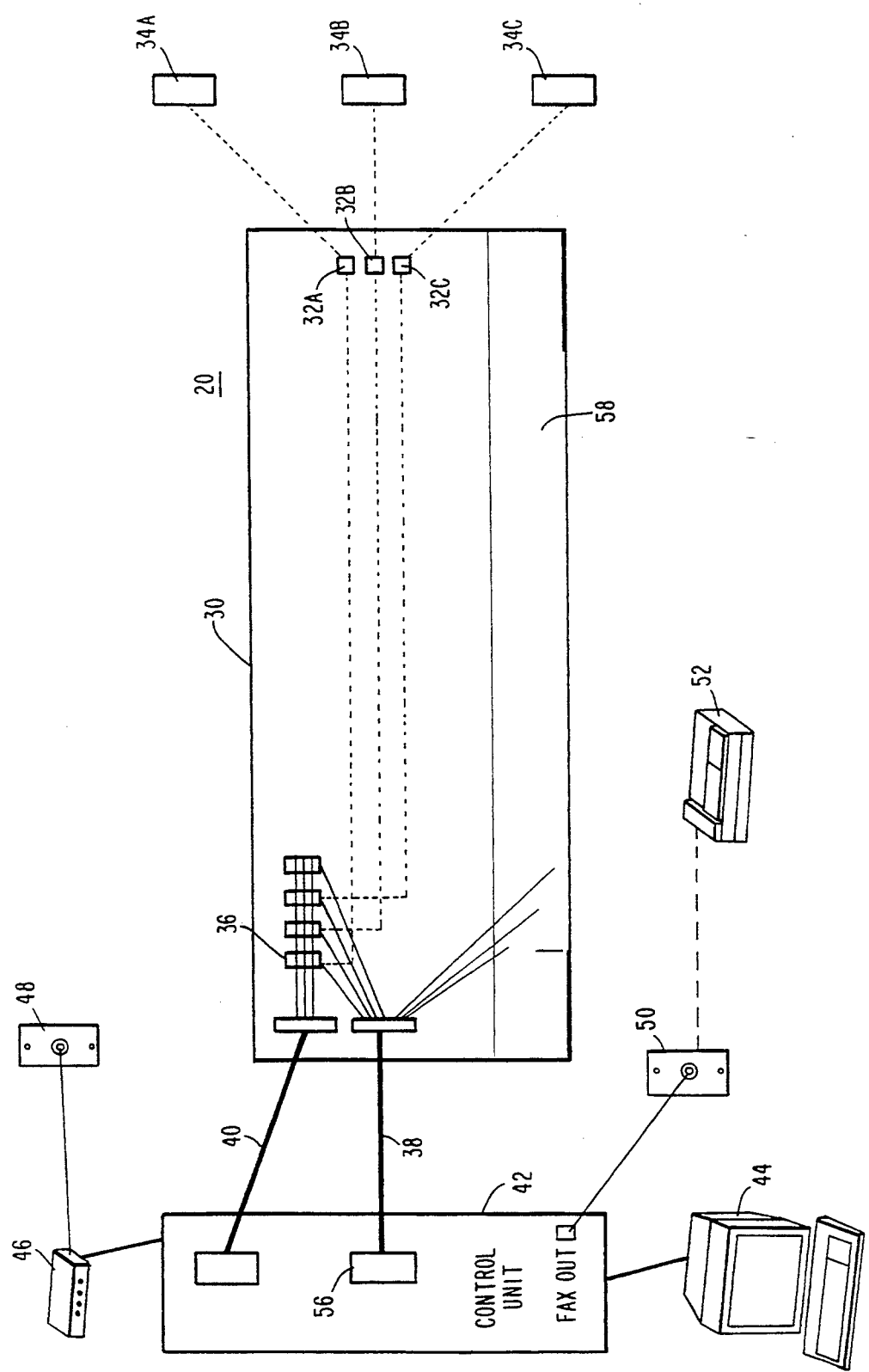
FIG. 2 is a simplified block diagram of the protocol analyzer unit.

The network analyzer unit 20 is shown in more detail in FIG. 2. A switching matrix relay board 30 is shown having input ports 32A through 32C. Connections are made to the input ports from the trunk lines and data circuits through appropriate interfaces shown as blocks 34A through 34C. The interfaces may be, for example, RS232, V.35 and T1. Only three of such inputs are shown for the sake of simplicity. Each of the input ports is connected to a corresponding switched relay connection 36 provided on the board. Each relay is controlled in accordance with a signal from switched relay control bus 38. Activated relays effect connection between the associated input and monitor bus 40.

Control unit 42 comprises protocol and network analyzer circuitry under control of a programmed computer as in the above described commercially available Bell Atlantic units. While the system is intended primarily for remote operation, display and keyboard 44 are provided for on site control. Buses 38 and 40 are connected to control unit 42. The control unit interacts with a remote computer through modem 46 and telephone line access 48. The control unit may include facsimile output capability whereby data can be transmitted to a remote facsimile machine 52 through telephone line access 50. Reference is made to copending application, Ser. No. 07/515,007, filed Apr. 26, 1990, for a more detailed description of facsimile dial out capability. Data also can be transmitted back to the host through one of the channels of the trunk line. Such transmissions can be scheduled remotely to automatically take place after data has been stored.

The control unit is thus a PC based protocol analyzer that allows remote access to multiple ports for protocol monitoring and performance analyzation. In response to remote signal commands received through modem 46, the control unit outputs signals through selecting relay control bus 38 to activate the appropriate relays 36. Selected lines are then monitored through the activated relays and monitor bus 40 by the control unit. Located within the control unit 42 is one or more circuit boards 56 which control the relays 36 as well as the control circuits on control unit 42 which set up the appropriate monitor sequences. These sequences and parameters are controlled by an access unit which may be mounted on the board 30 as illustrated at the portion 58. One suitable access unit commercially available for this purpose is the Model 545 CB Access Unit manufactured by Telepath Industries, Inc. of Roanoke, Va. The access unit is configured to set up the parameters which it is desired to monitor or analyze in the bit streams, such as, for example, AMI, 2B1Q, D, B1 or B2, etc.

The analyzer has the ability to monitor key data line parameters of network performance. The data can be used by the analyzer to produce histograms, pie charts and line graphs to provide a dynamic picture of data line utilization and transaction response times. Time-lapse playback gives a quick overview of past events. With such material, the user can rapidly recognize overloaded circuits and equipment as well as under used capacity. More specifically, parameters which are analyzed include line utilization; effective baud rate; average total response time; average host resident time; highest response time, with time and date of occurrence; response time histograms with user definable intervals; total number of transactions; over-threshold transactions: date, time of day, total response time, terminal address and transaction ID; rejects with date, time of day, and node address; and average poll list wrap time. The appropriate software for these functions resides in storage in the analyzer computer.

Figure 3A:
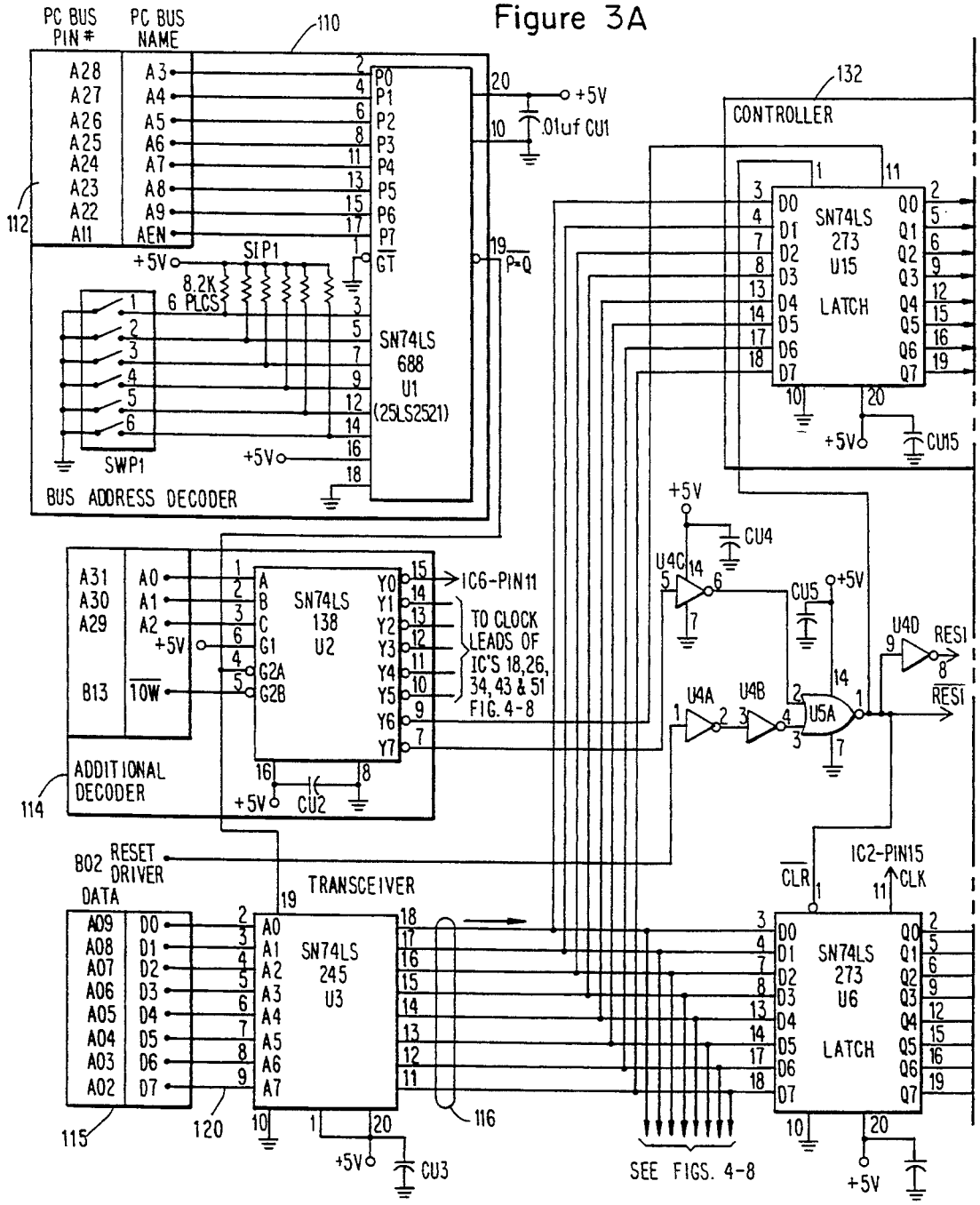
FIGS. 3 and 3A–3B show the two parts of a circuit diagram of the improved port selector and control circuit board.
Figures 3, 3B:
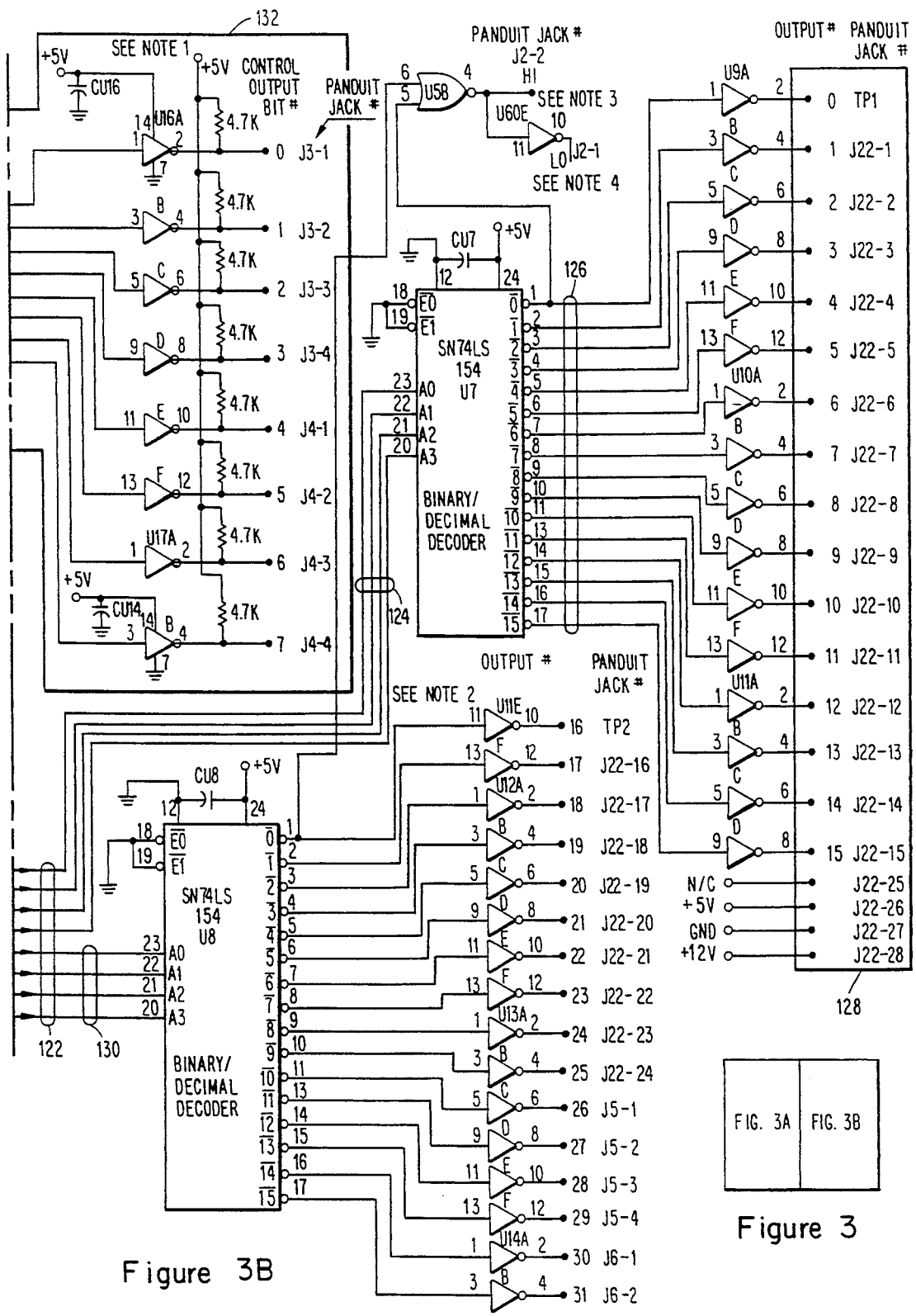
Figure 4:
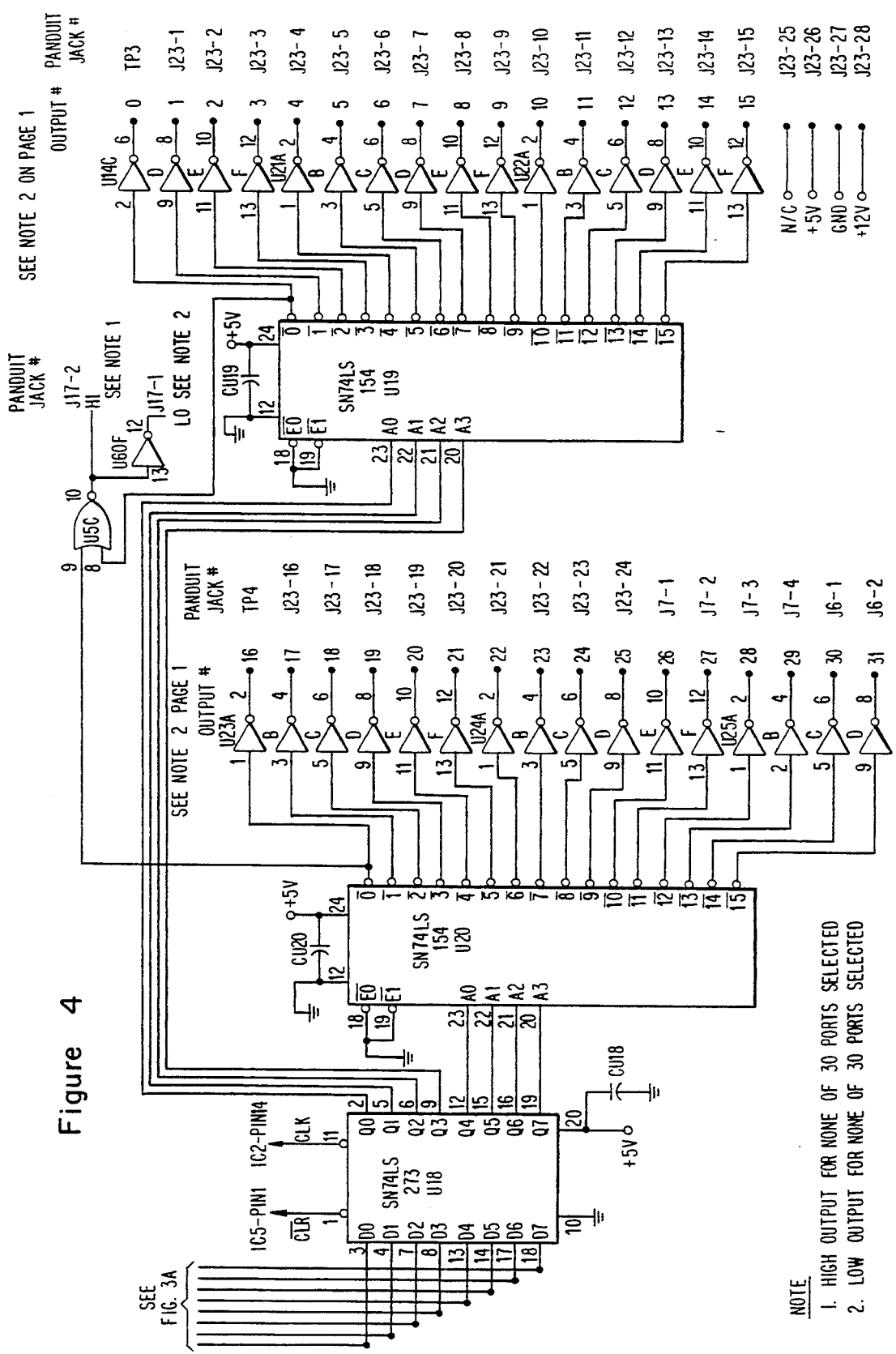
FIGS. 4–8 illustrate additional latch and decoder chips and relay outputs on the board.
Figure 5:
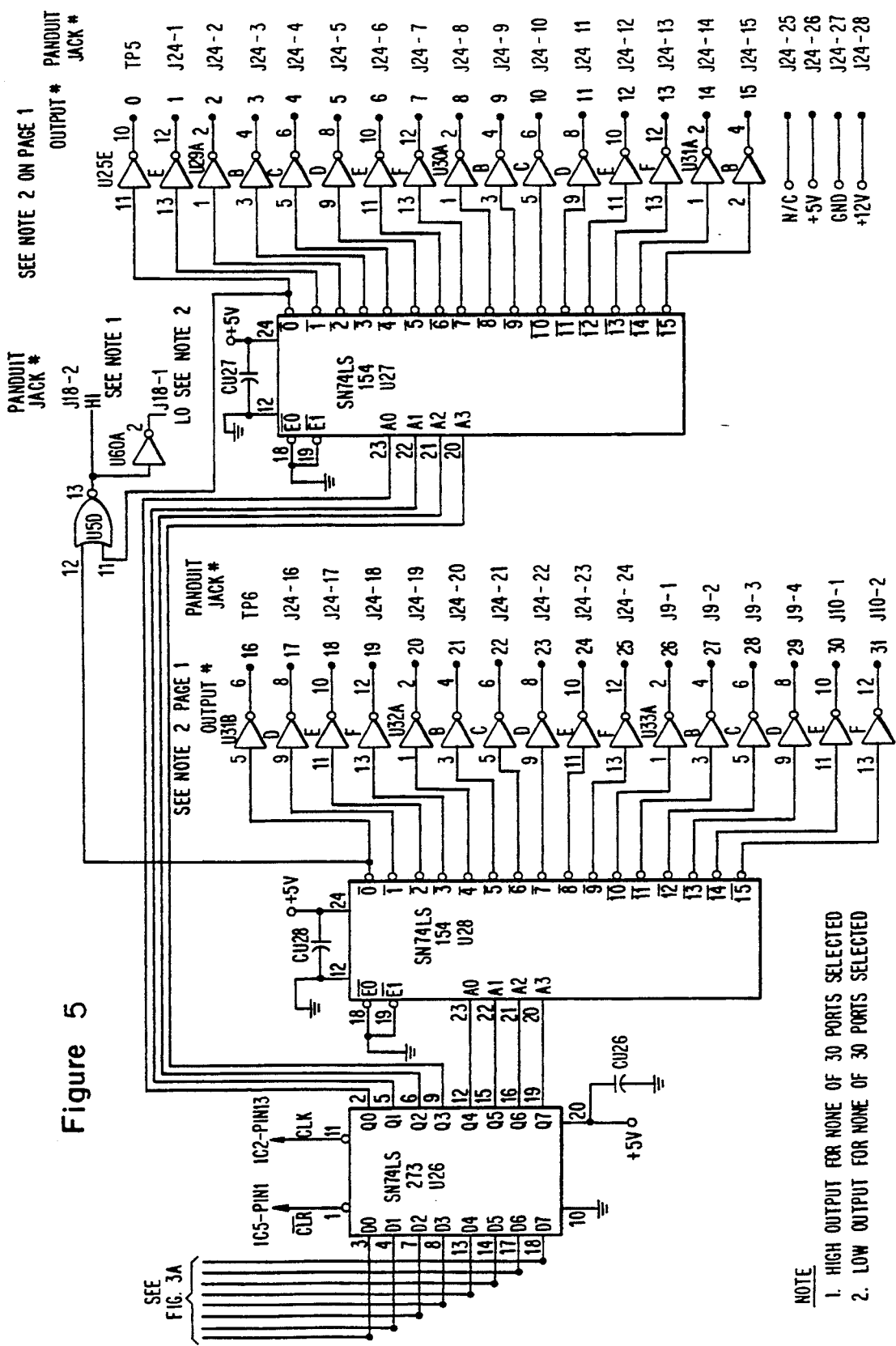
Figure 6:
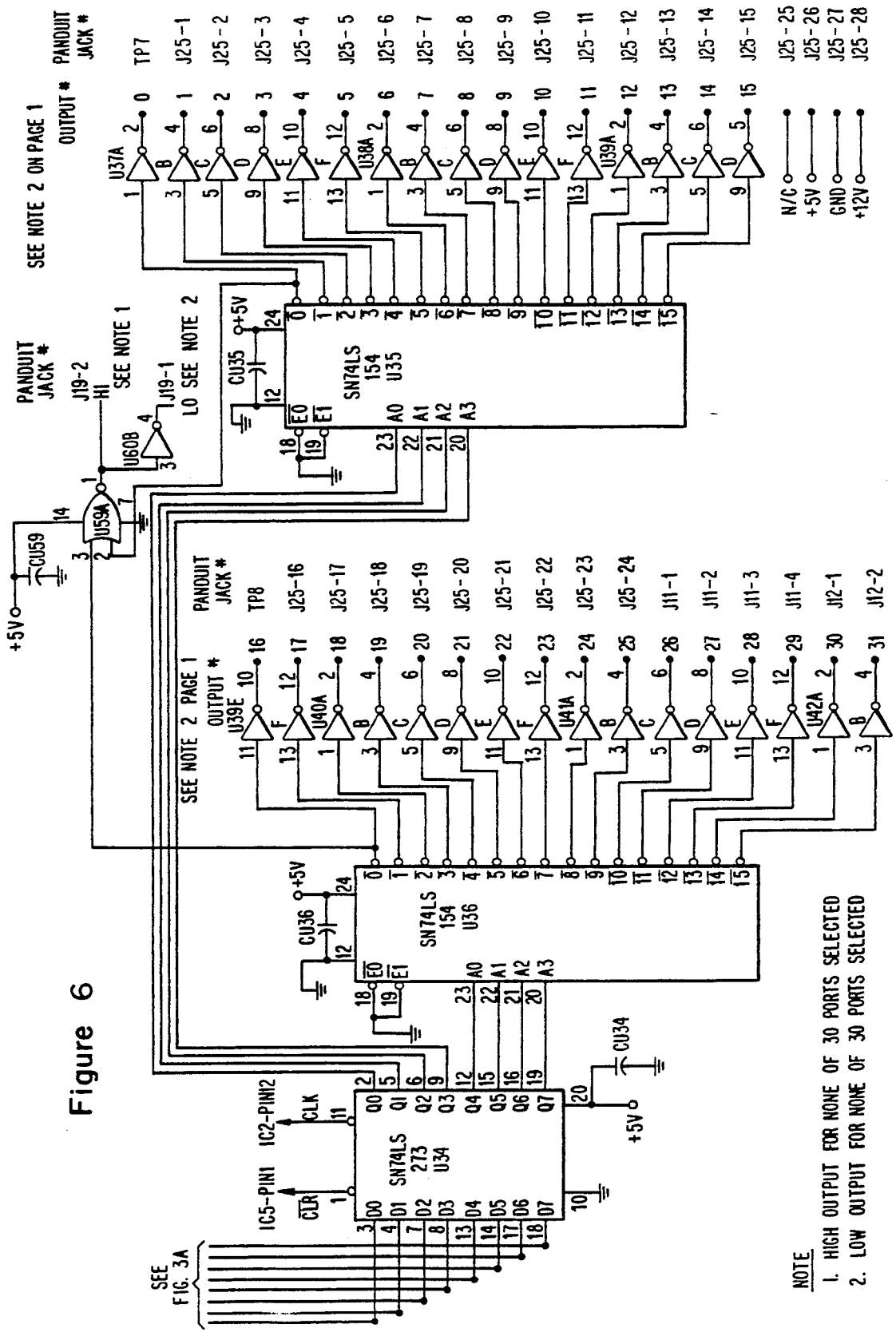
Figure 7:
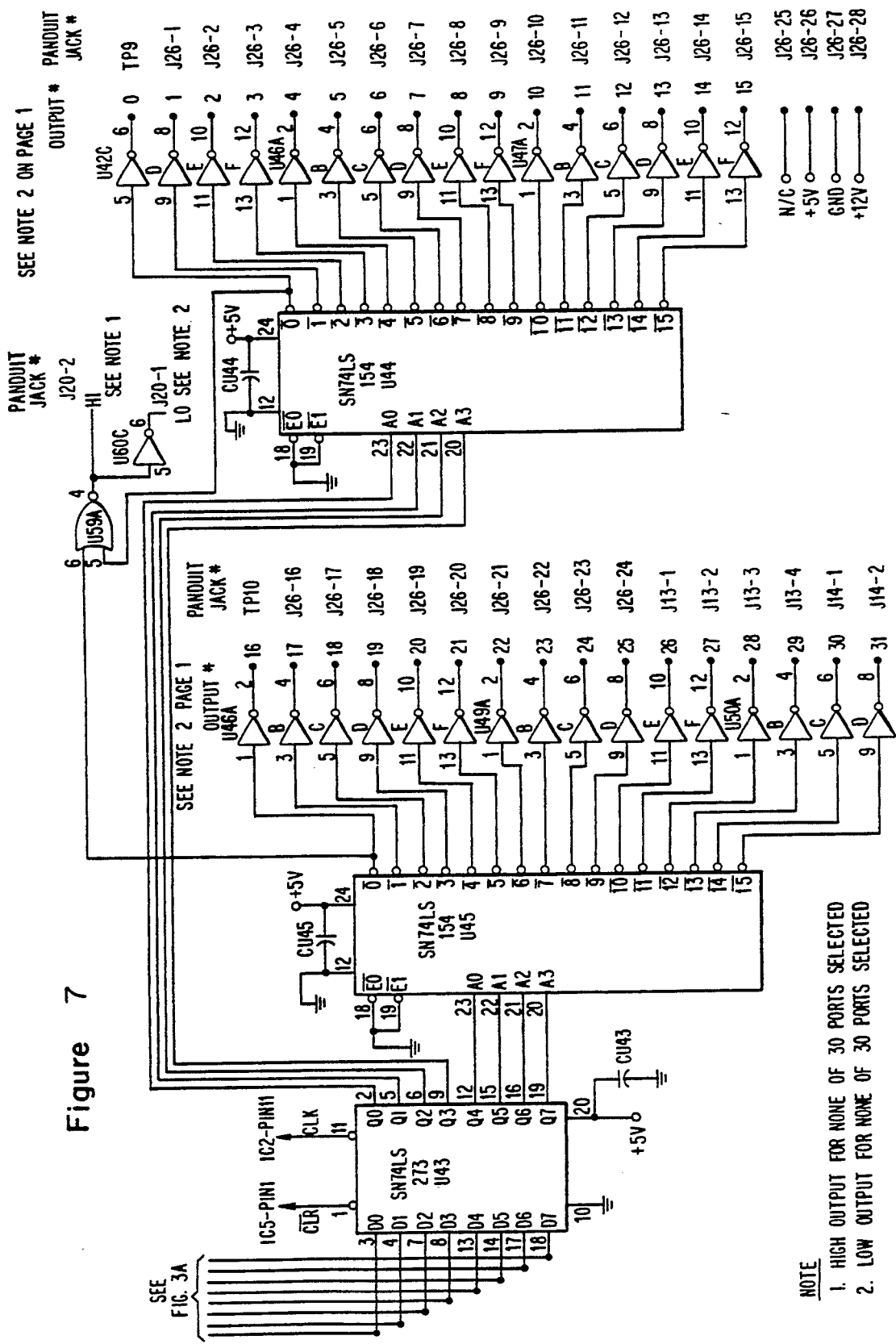
Figure 8:
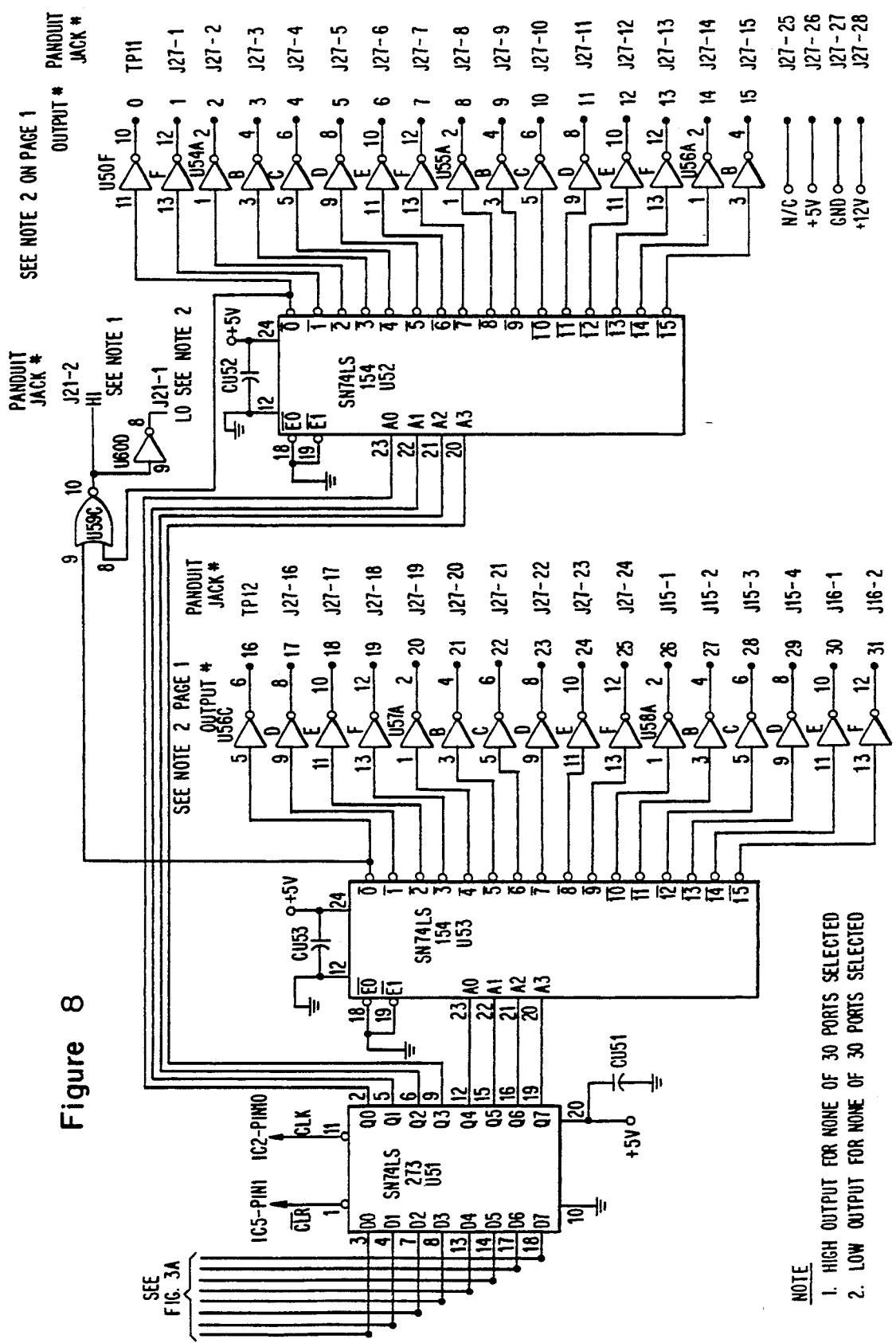

Referring to FIGS. 3A, 3B, 4-8 there is shown a circuit diagram of a port selector and control board 56 constructed according to the invention. A table of circuit abbreviations identifying IC's and explanations of circled numbers 1-4 in the circuit diagram is shown in FIG. 9. Referring to FIG. 3A there is seen at 110 a base address decoder which includes decoder U1 which may consist of a SN74LS688 IC or chip. The incoming address appears at the connector 112 which connects the address leads A28, A27, etc. to the analyzer PC address bus leads A3, A4, etc. The switch SWP1 may be manually or otherwise set to correspond to a specific address to be called up in the program. A table of typical HEX addresses and corresponding SWP1 switch settings is shown in FIG. 10.

When the controlling program outputs an address on the bus which matches the SWP1 switch settings the U1 chip produces a low signal out, on pin 19 which gates the U2 chip SN74LS138 in additional decoder 114. With the base address decoder chip U1 and the additional address decoder chip U2 it is possible to decode specific addresses such as 330, 331, 332, etc. The YO output on the U2 chip corresponds to the situation where the address is set at 330. Outputting the 330 address provides a low on pin 15. Outputting the address 331 would provide an output on pin 14, etc.

The output of the additional decoder chip U2 on pin 15, by way of example, goes to pin 11 on chip U6. The connections of the remaining pins 7-14 are indicated in FIG. 3A. The chip U6 constitutes a latch which allows address or data information appearing on data bus 116 to be clocked in and set up. The transceiver chip U3 is connected through connector 115 to data leads A09, A08, etc. The transceiver chip U3 in this embodiment is locked in the input direction to accept data from the incoming data bus 120, i.e., it is used in a one-way or write only configuration.

The binary output of the data latch U6, namely Q0-Q7 comprising one byte, is connected to 8 leads 122. The first four data leads 124 are connected to and provide input comprising one nibble to the binary decimal decoder chip U7. This may be a SN74LS154 which is a four input chip with 16 outputs to provide binary code into decimal output on leads 126. These are respectively connected to output inverters U9A-F, U10A-F, and U11A-D. The outputs of these inverters are connected to a Panduit jack output connector 128 as connections labeled J22-1 through J22-15. The "0" is a reset.

The second four data leads 130 from the latch chip U6 are connected to binary decimal decoder chip U8 and from there to inverters U11-U14 in a manner similar to binary decimal decoder U7. Decoders U7 and U8 each control 15 outputs or relays connected to their Panduit jack. This arrangement and operation is repeated a total of six times, feeding the output of decoder U2 in FIG. 3A to latch U18 and binary decimal decoders U19 and U20 in FIG. 4, to latch U26 and binary decimal decoders U27 and U28 in FIG. 5, to latch U34 and binary decimal decoders U35 and U36 in FIG. 6, to latch J43 and binary decimal decoders U44 and U45 in FIG. 7, and to latch U51 and binary decimal decoders U52 and U53 in FIG. 8.

The address 330 by way of example will control the first pair of binary to decimal decoders U7 and U8 which will produce 30 possible outputs. The next output goes to the second binary to decimal decoder pair U19 and U20 in FIG. 4 to control 30 additional outputs or relays. This is repeated in groups of 30 in FIGS. 5-8. The last output Y7 of decoder U2, which in the example using base address 330 would be 337, does not go to another set of decoders but to inverter chips U4A, U4B, U4C and U4D and NOR gate U5A to reset all relays. Thus all relays can be dropped by an output to address 337 instead of requiring specific addresses to drop relays individually. The program utilizes this capability so that if a user has a circuit under test and cuts the system off there will be no inadvertent leaving of something under test. The reset address would be delivered to automatically reset and drop everything which may have been left up.

It is a feature of the invention that the additional decoder U2 shown at 114 in FIG. 3A has an address, which is here 336, which is used for control purposes. When the address 336 is used the additional decoder U2 provides an output at Y6 to control the latch U15 which is similar to the latch U6 which has been described. This arrangement makes it possible to capture and utilize information on the data leads for control purposes by utilizing the 336 address. This drives the control section 132 which provides control output bits at the Panduit jack terminals J3 1-4 and J4 1-4.

Figure 11:
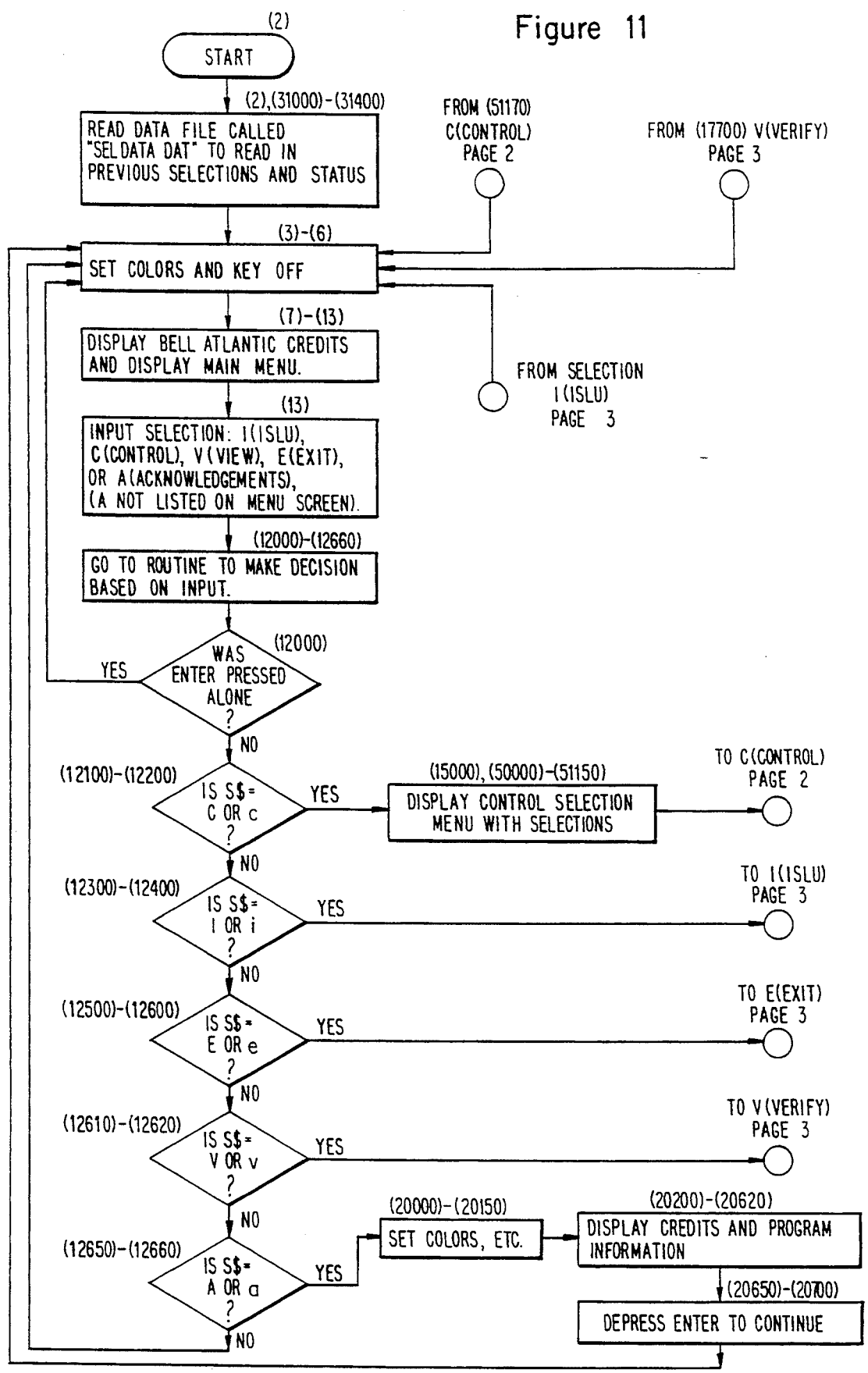
Figure 12:
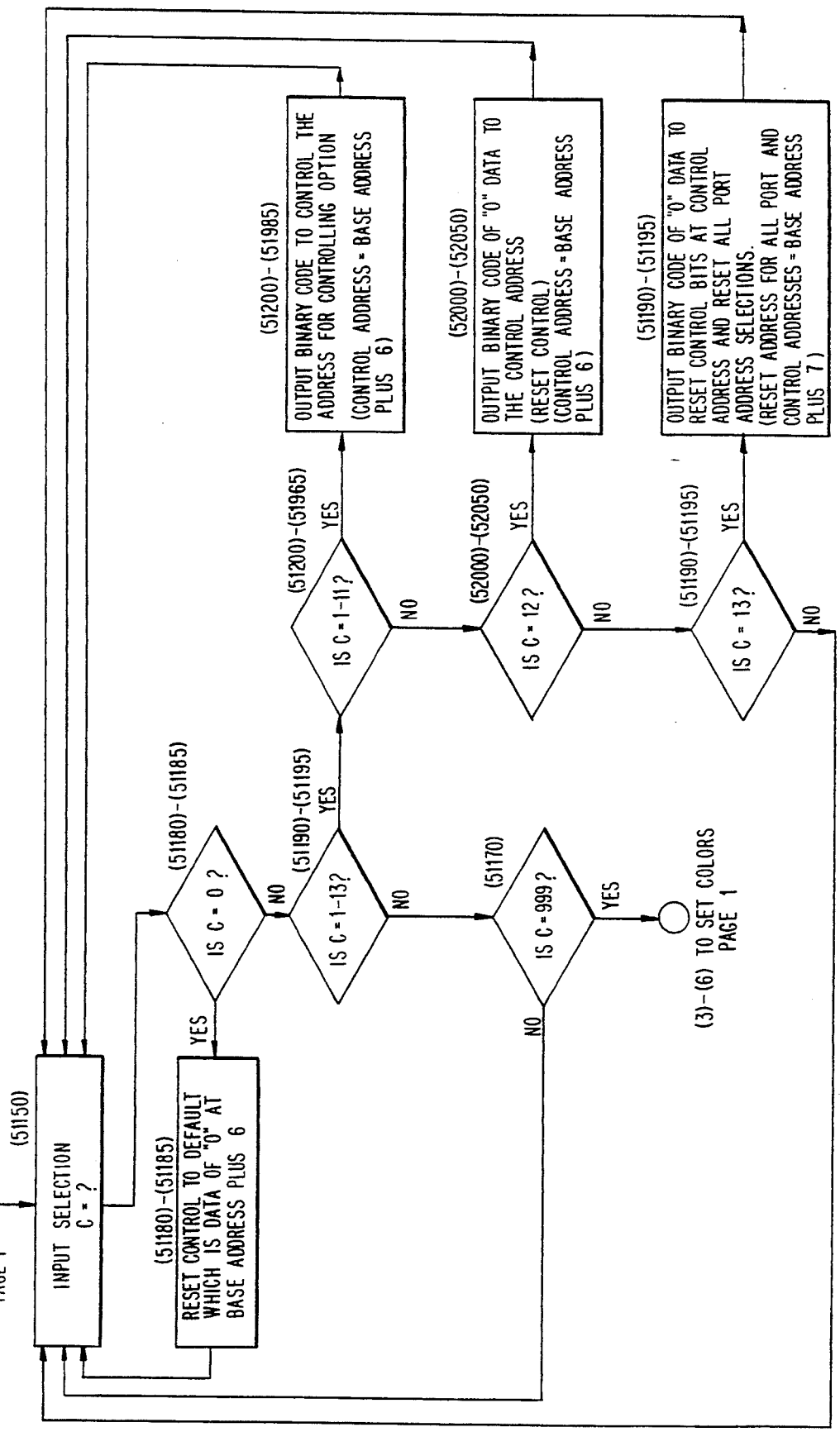

This arrangement permits the board illustrated in FIGS. 3A, 3B, 4-8 to serve the dual purpose of controlling 180 ports while also serving to control the analyzer or test set. That is, the board provides programmably separate control leads that provides to the analyzer directions as to the parameters of the test to be performed after the port to be tested has been selected by the same board. By appropriate writing of the software this provides the flexibility of reconfiguring the board so that it may be provided as a 24 port controller for the purposes of a user desiring only 24 ports but may thereafter be expanded to its full capability without hardware replacement. Thus when the user requests additional port control it is only necessary to provide a cable with additional plugs and new software to provide activation. A specific example of preferred program is attached as Appendix 1 with the flow chart for that program illustrated in FIGS. 11-13. The program provides simple menu screens whereby the user need only follow directions to set up the equipment to perform the desired function. Samples of such menus are illustrated in FIGS. 14-17. The entire operation may be menu driven.

It will be appreciated that the invention provides an efficient and economic system for remote and unattended protocol analysis using protocol analysis circuitry at a site at which a plurality of private line data circuits are interconnected with one of more trunk lines wherein the analysis circuitry is wired into each of the data circuits and trunk lines and a programmed microprocessor is installed at the site for control of the analysis circuitry and selection of the circuit to be tested using an improved control and port selection arrangement.

While the improved port selector and control circuitry of the invention is primarily adapted for use in a communications network environment the selector and control circuitry may have other uses in an IBM of IBM compatible computer environment. Thus the combination may be used for local or remote control of industrial machines, control and selection of radio equipment of radio channels such as radio repeater equipment at a remote location, and various types of equipment control.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

APPENDIX 1

```
2 GOTO 31000
3 COLOR 7,0,0:CLS
5 KEY OFF
6 COLOR 0,2,0:CLS
7 LOCATE 1,11:PRINT "BELL ATLANTIC TEST SYSTEMS CONTROL AND ISLU SELECT PROGRAM"
:LOCATE 2,22:PRINT "(C) BELL ATLANTIC TEST SYSTEMS 1991":LOCATE 3,33:PRINT "VERS
ION 3.4-24" 'PROGRAM WRITTEN BY KENNETH L. ROLAND ON 08-26-1991
10 PRINT:PRINT:PRINT:PRINT:PRINT:PRINT:PRINT "         DO YOU WISH TO SELECT T
HE CONTROL OR ISLU SELECT FUNCTION?"
12 PRINT:PRINT:PRINT "   DEPRESS ( C ) FOR CONTROL OR  ( I ) FOR ISLU  OR  ( V )
 FOR VIEWING STATUS                                  ( E ) TO EXIT"
13 PRINT:PRINT:INPUT "         PLEASE MAKE YOUR SELECTION FOLLOWED BY THE E
NTER KEY:",SS
14 GOTO 12000
15 OUT &H330,0:OUT &H331,0:OUT &H332,0:OUT &H333,0:OUT &H334,0:OUT &H335,0
16 I=0:L=I
17 COLOR 0,3,4:CLS
18 LOCATE 11,25:PRINT "NO ISLU IS PRESENTLY SELECTED"
```

```
19 LOCATE 1,17:PRINT "BELL ATLANTIC TEST SYSTEMS ISLU SELECT PROGRAM":LOCATE 2,2
2:PRINT "(C) BELL ATLANTIC TEST SYSTEMS 1991":LOCATE 3,33:PRINT "VERSION 3.4-24"
'PROGRAM WRITTEN BY KENNETH L. ROLAND ON 08-26-1991
20 LOCATE 9,29:PRINT "(OR ENTER 999 TO EXIT)":LOCATE 8,25:INPUT "ENTER ISLU TO M
ONITOR (1-24):",I:CLS:LOCATE 11,25:PRINT "ISLU NUMBER SELECTED IS ";I:IF I>24 TH
EN GOSUB 60000
30 OUT &H330,0:OUT &H331,0:OUT &H332,0:OUT &H333,0:OUT &H334,0:OUT &H335,0
40 D=0
45 L = I
50 IF I>24 GOTO 9200 ELSE 500
500 IF I=0 THEN GOSUB 60000
510 IF I=1 THEN D=1
520 IF I=2 THEN D=2
530 IF I=3 THEN D=3
540 IF I=4 THEN D=4
550 IF I=5 THEN D=5
560 IF I=6 THEN D=6
570 IF I=7 THEN D=7
580 IF I=8 THEN D=8
590 IF I=9 THEN D=9
600 IF I=10 THEN D=10
610 IF I=11 THEN D=11
620 IF I=12 THEN D=12
630 IF I=13 THEN D=13
640 IF I=14 THEN D=14
650 IF I=15 THEN D=15
660 IF I=16 THEN D=16
670 IF I=17 THEN D=32
680 IF I=18 THEN D=48
690 IF I=19 THEN D=64
700 IF I=20 THEN D=80
710 IF I=21 THEN D=96
720 IF I=22 THEN D=112
730 IF I=23 THEN D=128
740 IF I=24 THEN D=144
900 OUT &H330,D
1000 GOTO 19
1100 IF I=25 THEN D=1
1110 IF I=26 THEN D=2
1120 IF I=27 THEN D=3
1130 IF I=28 THEN D=4
1140 IF I=29 THEN D=5
1150 IF I=30 THEN D=6
1160 IF I=31 THEN D=7
1170 IF I=32 THEN D=8
1180 IF I=33 THEN D=9
1190 IF I=34 THEN D=10
1200 IF I=35 THEN D=11
1210 IF I=36 THEN D=12
1220 IF I=37 THEN D=13
1230 IF I=38 THEN D=14
1240 IF I=39 THEN D=15
1250 IF I=40 THEN D=16
1260 IF I=41 THEN D=32
1270 IF I=42 THEN D=48
1280 IF I=43 THEN D=64
1290 IF I=44 THEN D=80
1300 IF I=45 THEN D=96
1310 IF I=46 THEN D=112
1320 IF I=47 THEN D=128
1330 IF I=48 THEN D=144
1500 OUT &H331,D
2000 GOTO 19
2100 IF I=49 THEN D=1
2110 IF I=50 THEN D=2
2120 IF I=51 THEN D=3
2130 IF I=52 THEN D=4
2140 IF I=53 THEN D=5
2150 IF I=54 THEN D=6
2160 IF I=55 THEN D=7
2170 IF I=56 THEN D=8
2180 IF I=57 THEN D=9
2190 IF I=58 THEN D=10
2200 IF I=59 THEN D=11
2210 IF I=60 THEN D=12
2220 IF I=61 THEN D=13
2230 IF I=62 THEN D=14
```

```
2240 IF I=63 THEN D=15
2250 IF I=64 THEN D=16
2260 IF I=65 THEN D=32
2270 IF I=66 THEN D=48
2280 IF I=67 THEN D=64
2290 IF I=68 THEN D=80
2300 IF I=69 THEN D=96
2310 IF I=70 THEN D=112
2320 IF I=71 THEN D=128
2330 IF I=72 THEN D=144
2500 OUT &H332,D
3000 GOTO 19
3100 IF I=73 THEN D=1
3110 IF I=74 THEN D=2
3120 IF I=75 THEN D=3
3130 IF I=76 THEN D=4
3140 IF I=77 THEN D=5
3150 IF I=78 THEN D=6
3160 IF I=79 THEN D=7
3170 IF I=80 THEN D=8
3180 IF I=81 THEN D=9
3190 IF I=82 THEN D=10
3200 IF I=83 THEN D=11
3210 IF I=84 THEN D=12
3220 IF I=85 THEN D=13
3230 IF I=86 THEN D=14
3240 IF I=87 THEN D=15
3250 IF I=88 THEN D=16
3260 IF I=89 THEN D=32
3270 IF I=90 THEN D=48
3280 IF I=91 THEN D=64
3290 IF I=92 THEN D=80
3300 IF I=93 THEN D=96
3310 IF I=94 THEN D=112
3320 IF I=95 THEN D=128
3330 IF I=96 THEN D=144
3500 OUT &H333,D
4000 GOTO 19
4100 IF I=97 THEN D=1
4110 IF I=98 THEN D=2
4120 IF I=99 THEN D=3
4130 IF I=100 THEN D=4
4140 IF I=101 THEN D=5
4150 IF I=102 THEN D=6
4160 IF I=103 THEN D=7
4170 IF I=104 THEN D=8
4180 IF I=105 THEN D=9
4190 IF I=106 THEN D=10
4200 IF I=107 THEN D=11
4210 IF I=108 THEN D=12
4220 IF I=109 THEN D=13
4230 IF I=110 THEN D=14
4240 IF I=111 THEN D=15
4250 IF I=112 THEN D=16
4260 IF I=113 THEN D=32
4270 IF I=114 THEN D=48
4280 IF I=115 THEN D=64
4290 IF I=116 THEN D=80
4300 IF I=117 THEN D=96
4310 IF I=118 THEN D=112
4320 IF I=119 THEN D=128
4330 IF I=120 THEN D=144
4500 OUT &H334,D
5000 GOTO 19
5100 IF I=121 THEN D=1
5110 IF I=122 THEN D=2
5120 IF I=123 THEN D=3
5130 IF I=124 THEN D=4
5140 IF I=125 THEN D=5
5150 IF I=126 THEN D=6
5160 IF I=127 THEN D=7
5170 IF I=128 THEN D=8
5180 IF I=129 THEN D=9
5190 IF I=130 THEN D=10
5200 IF I=131 THEN D=11
5210 IF I=132 THEN D=12
5220 IF I=133 THEN D=13
```

```
5230 IF I=134 THEN D=14
5240 IF I=135 THEN D=15
5250 IF I=136 THEN D=16
5260 IF I=137 THEN D=32
5270 IF I=138 THEN D=48
5280 IF I=139 THEN D=64
5290 IF I=140 THEN D=80
5300 IF I=141 THEN D=96
5310 IF I=142 THEN D=112
5320 IF I=143 THEN D=128
5330 IF I=144 THEN D=144
5500 OUT &H335,D
6000 GOTO 19
9200 REM IF I>144 THEN GOTO 19 ELSE 9400
9400 REM IF I>120 THEN GOTO 5100 ELSE 9500
9500 REM IF I>96 THEN GOTO 4100 ELSE 9600
9600 REM IF I>72 THEN GOTO 3100 ELSE 9700
9700 REM IF I>48 THEN GOTO 2100 ELSE 9800
9800 IF I>24 THEN GOTO 19 ELSE 19
12000 IF S$ = "" THEN GOTO 3 ELSE 12100
12100 IF S$ = "C" THEN GOTO 15000 ELSE 12200
12200 IF S$ = "c" THEN GOTO 15000 ELSE 12300
12300 IF S$ = "I" THEN GOTO 15 ELSE 12400
12400 IF S$ = "i" THEN GOTO 15 ELSE 12500
12500 IF S$ = "E" THEN GOTO 30000 ELSE 12600
12600 IF S$ = "e" THEN GOTO 30000 ELSE 12610
12610 IF S$ = "V" THEN GOTO 17000 ELSE 12620
12620 IF S$ = "v" THEN GOTO 17000 ELSE 12650
12650 IF S$ = "A" THEN GOTO 20000 ELSE 12660
12660 IF S$ = "a" THEN GOTO 20000 ELSE 12700
12700 GOTO 3
15000 CLS:GOTO 50000
15200 CLS:GOTO 3
17000 CLS
17100 LOCATE 1,11:PRINT "BELL ATLANTIC TEST SYSTEMS CONTROL AND ISLU STATUS PROGRAM":LOCATE 2,22:PRINT "(C) BELL ATLANTIC TEST SYSTEMS 1991":LOCATE 3,33:PRINT " VERSION 3.4-24" 'PROGRAM WRITTEN BY KENNETH L. ROLAND ON 08-26-1991
17200 LOCATE 10,6:PRINT "ISLU SELECTED IS: ";L
17250 IF L = 0 THEN LOCATE 10,25:PRINT "NONE                "
17260 IF L > 24 THEN LOCATE 10,25:PRINT "INVALID             "
17300 IF V=0 THEN C$="DEFAULT - ATT AMI PROTOCOL ON D CHANNEL        "
17310 IF V=1 THEN C$="ATT AMI PROTOCOL ON B1 CHANNEL                 "
17320 IF V=2 THEN C$="ATT AMI PROTOCOL ON B2 CHANNEL                 "
17330 IF V=3 THEN C$="ATT AMI - D CHANNEL WITH REMOTE POWER OVERRIDE "
17340 IF V=4 THEN C$="ATT AMI - B1 CHANNEL WITH REMOTE POWER OVERRIDE"
17350 IF V=5 THEN C$="ATT AMI - B2 CHANNEL WITH REMOTE POWER OVERRIDE"
17360 IF V=6 THEN C$="2B1Q PROTOCOL ON D CHANNEL                     "
17370 IF V=7 THEN C$="2B1Q PROTOCOL ON B1 CHANNEL                    "
17380 IF V=8 THEN C$="2B1Q PROTOCOL ON B2 CHANNEL                    "
17390 IF V=9 THEN C$="2B1Q - D CHANNEL WITH REMOTE POWER OVERRIDE    "
17400 IF V=10 THEN C$="2B1Q - B1 CHANNEL WITH REMOTE POWER OVERRIDE  "
17410 IF V=11 THEN C$="2B1Q - B2 CHANNEL WITH REMOTE POWER OVERRIDE  "
17420 IF V=12 THEN C$="RELEASE ALL CONTROL FUNCTIONS TO DEFAULT VALUES"
17430 IF V=13 THEN C$="RESET ALL CONTROL AND ISLU'S                  "
17450 IF V>13 THEN C$="INVALID                                       "
17500 LOCATE 14,6:PRINT "CONTROL LAST SELECTED IS: ";C$
17600 LOCATE 20,6:INPUT "DEPRESS THE ENTER KEY TO RETURN TO THE MAIN MENU: ",E$
17700 GOTO 3
20000 COLOR 7,0,0:CLS
20100 KEY OFF
20150 COLOR 0,2,0:CLS
20200 LOCATE 8,17:PRINT "This program was written by Kenneth L. Roland of"
20250 LOCATE 10,28:PRINT "Bell Atlantic Test Systems"
20300 LOCATE 11,30:PRINT "6917 Patterson Avenue"
20350 LOCATE 12,29:PRINT "Richmond, Virginia 23226"
20360 LOCATE 14,25:PRINT "PHONE 800-542-8796 OR 804-673-9942"
20400 LOCATE 16,3:PRINT "This is Version 3.4-24 to select 1 to 24 ISLU Ports and provides seperate"
20450 LOCATE 17,3:PRINT "Control Leads to control the Power Override Relay Driver IC and control"
20500 LOCATE 18,3:PRINT "for the protocol decoder circuit board in the protocol analyzer box."
20550 LOCATE 19,3:PRINT "The Control Selector Board in the Control Module was also hardware designed"
20600 LOCATE 20,3:PRINT "by Kenneth L. Roland and has a PATENT PENDING ON THE CIRCUIT BOARD."
```

```
20620 LOCATE 6,25:PRINT "(Program Date - August 26, 1991)
20650 LOCATE 23,28:INPUT "DEPRESS ENTER TO CONTINUE  ", Z$
20700 GOTO 3
30000 OPEN "O",#1,"SELDATA.DAT"
30100 WRITE#1,V,L
30200 CLOSE#1
30300 GOTO 40000
31000 OPEN "I",#1,"SELDATA.DAT"
31100 INPUT#1,V,L
31200 IF EOF(1) THEN GOTO 31300
31300 CLOSE#1
31400 GOTO 3
40000 COLOR 7,0,0:CLS:SYSTEM
50000 LOCATE 1,15:PRINT "BELL ATLANTIC TEST SYSTEMS CONTROL SELECT PROGRAM":LOCA
TE 2,22:PRINT "(C) BELL ATLANTIC TEST SYSTEMS 1991":LOCATE 3,33:PRINT "VERSION 3
50050 LOCATE 7,5:PRINT "0.    ATT AMI ON D CHANNEL IS THE DEFAULT WITH 0 OR NO SEL
ECTION MADE"
50100 LOCATE 8,5:PRINT "1.    SELECT ATT AMI PROTOCOL ON B1 CHANNEL"
50150 LOCATE 9,5:PRINT "2.    SELECT ATT AMI PROTOCOL ON B2 CHANNEL"
50200 LOCATE 10,5:PRINT "3.    SELECT ATT AMI PROTOCOL ON D CHANNEL WITH REMOTE PO
WER OVERRIDE"
50250 LOCATE 11,5:PRINT "4.    SELECT ATT AMI PROTOCOL ON B1 CHANNEL WITH REMOTE P
OWER OVERRIDE"
50300 LOCATE 12,5:PRINT "5.    SELECT ATT AMI PROTOCOL ON B2 CHANNEL WITH REMOTE P
OWER OVERRIDE"
50350 LOCATE 13,5:PRINT "6.    SELECT 2B1Q PROTOCOL ON D CHANNEL"
50400 LOCATE 14,5:PRINT "7.    SELECT 2B1Q PROTOCOL ON B1 CHANNEL"
50450 LOCATE 15,5:PRINT "8.    SELECT 2B1Q PROTOCOL ON B2 CHANNEL"
50500 LOCATE 16,5:PRINT "9.    SELECT 2B1Q PROTOCOL ON D CHANNEL WITH REMOTE POWER
 OVERRIDE"
50550 LOCATE 17,4:PRINT "10.   SELECT 2B1Q PROTOCOL ON B1 CHANNEL WITH REMOTE POW
ER OVERRIDE"
50600 LOCATE 18,4:PRINT "11.   SELECT 2B1Q PROTOCOL ON B2 CHANNEL WITH REMOTE POW
ER OVERRIDE"
50650 LOCATE 19,4:PRINT "12.   RELEASE ALL CONTROL FUNCTIONS TO DEFAULT VALUES"
50700 LOCATE 20,4:PRINT "13.   RESET ALL CONTROL AND ISLU'S"
51000 LOCATE 22,32:PRINT "ENTER 999 TO EXIT"
51050 LOCATE 23,1:PRINT "CONTROL FUNCTION SELECTED IS:  "
51060 IF V=0 THEN LOCATE 23,32:PRINT "DEFAULT - ATT AMI PROTOCOL ON D CHANNEL
 "
51100 C=0
51150 LOCATE 5,5:INPUT "SELECT THE NUMBER OF THE CONTROL FUNCTION FOLLOWED BY TH
E ENTER KEY:",C:LOCATE 5,73:PRINT "       "
51170 IF C=999 GOTO 3
51175 V = C
51180 IF C=0 THEN OUT &H336,0 ELSE GOTO 51185
51185 IF C=0 THEN 55100 ELSE 51190
51190 IF C>13 THEN LOCATE 23,32:PRINT "INVALID
       " ELSE 51195
51195 IF C>13 THEN OUT &H336,0 ELSE GOTO 51200
51200 IF C=1 THEN OUT &H336,6 ELSE GOTO 51250
51250 IF C=1 THEN LOCATE 23,32:PRINT "ATT AMI PROTOCOL ON B1 CHANNEL
       " ELSE 51300
51300 IF C=2 THEN OUT &H336,2 ELSE GOTO 51350
51350 IF C=2 THEN LOCATE 23,32:PRINT "ATT AMI PROTOCOL ON B2 CHANNEL
       " ELSE 51400
51400 IF C=3 THEN OUT &H336,8 ELSE GOTO 51450
51450 IF C=3 THEN LOCATE 23,32:PRINT "ATT AMI - D CHANNEL WITH REMOTE POWER OVER
RIDE " ELSE 51500
51500 IF C=4 THEN OUT &H336,14 ELSE GOTO 51550
51550 IF C=4 THEN LOCATE 23,32:PRINT "ATT AMI - B1 CHANNEL WITH REMOTE POWER OVE
RRIDE " ELSE 51600
51600 IF C=5 THEN OUT &H336,10 ELSE GOTO 51650
51650 IF C=5 THEN LOCATE 23,32:PRINT "ATT AMI - B2 CHANNEL WITH REMOTE POWER OVE
RRIDE " ELSE 51700
51700 IF C=6 THEN OUT &H336,1 ELSE GOTO 51750
51750 IF C=6 THEN LOCATE 23,32:PRINT "2B1Q PROTOCOL ON D CHANNEL
       " ELSE 51800
51800 IF C=7 THEN OUT &H336,7 ELSE GOTO 51850
51850 IF C=7 THEN LOCATE 23,32:PRINT "2B1Q PROTOCOL ON B1 CHANNEL
       " ELSE 51900
51900 IF C=8 THEN OUT &H336,3 ELSE GOTO 51950
51950 IF C=8 THEN LOCATE 23,32:PRINT "2B1Q PROTOCOL ON B2 CHANNEL
       " ELSE 51960
51960 IF C=9 THEN OUT &H336,9 ELSE GOTO 51965
51965 IF C=9 THEN LOCATE 23,32:PRINT "2B1Q - D CHANNEL WITH REMOTE POWER OVERRID
```

```
E        " ELSE GOTO 51970
51970 IF C=10 THEN OUT &H336,15 ELSE GOTO 51975
51975 IF C=10 THEN LOCATE 23,32:PRINT "2B1Q - B1 CHANNEL WITH REMOTE POWER OVERR-
      IDE  " ELSE GOTO 51980
51980 IF C=11 THEN OUT &H336,11 ELSE GOTO 51985
51985 IF C=11 THEN LOCATE 23,32:PRINT "2B1Q - B2 CHANNEL WITH REMOTE POWER OVERR
      IDE  " ELSE GOTO 52000
52000 IF C=12 THEN OUT &H336,0 ELSE GOTO 52050
52050 IF C=12 THEN LOCATE 23,32:PRINT "RELEASE ALL CONTROL FUNCTIONS TO DEFAULT
      VALUES" ELSE 52100
52100 IF C=13 THEN OUT &H337,0 ELSE GOTO 52150
52150 IF C=13 THEN LOCATE 23,32:PRINT "RESET ALL CONTROL AND ISLU'S
      " ELSE 52200
52200 IF V = 13 THEN L = 0
55000 GOTO 50000
55100 CLS:GOTO 50000
55200 GOTO 50000
59000 GOTO 3
59100 LOCATE 23,32:PRINT "PLEASE MAKE YOUR CHOICE                ":GOTO 51150
60000 IF I=998 THEN GOTO 3 ELSE 60100
60100 IF I=999 THEN GOTO 3 ELSE 60200
60200 LOCATE 13,32:PRINT "INVALID SELECTION"
60500 LOCATE 11,50:PRINT "INVALID"
61000 LOCATE 14,29:PRINT "ALL ISLU RELAYS RELEASED"
62000 RETURN
```

I claim:

1. In a telecommunications system including multiple links for transmitting data, remotely controllable Microprocessor Controlled Analyzer (MCA) means for analyzing said data, and multiple switch means associated with said links for connecting said links to said MCA means to effect monitoring of data carried by said links, the improvement comprising:
multiple first decoders each having output connections to a group of said switch means,
each said first decoder having multiple input connections fewer in number than said output connections,
a plurality of latches each having multiple input connections arranged for receiving binary coded input data and multiple output connections with one group of said output connections being connected to the input connection of one of said first decoders and another group of output connections connected to the input connection of another of said first decoders,
means for connecting the input connections of said latches to a data bus in said MCA means,
a second decoder connected to an address bus in said MCA means and connected to control said latches in accordance with address data received from said MCA means,
and control latch means connected to said data bus in said MCA means for producing a binary coded control output to control said MCA means.

2. A telecommunications system according to claim 1 wherein each of said first decoders comprise a binary to decimal decoder.

3. A telecommunications system according to claim 2 wherein said input connections to each of said first decoders consist of 4 connections to input 4 bits.

4. A telecommunications system according to claim 3 wherein said output connections from each of said first decoders consist of 16 connections to output 16 bits.

5. A telecommunications system according to claim 4 wherein 15 relays are connected to the output connections of each of said first decoders and controlled thereby to connect 15 links to said MCA means.

6. A telecommunications system according to claim 1 wherein said switch means comprise relays and said first decoder output connections are connected to said relays through relay drivers.

7. A telecommunications system according to claim 1 wherein said second decoder includes settable switch means for establishing an address for said second decoder.

8. A telecommunications system according to claim 7 wherein said settable switch means are manually settable.

9. A telecommunications system according to claim 1 wherein each latch is connected to said data bus through a one-way write only connection.

10. A telecommunications system according to claim 1 wherein each of said plurality of latches has 8 bit inputs and 8 bit outputs with 4 said 8 bit outputs being connected to one of said first decoders and the other 4 of said 8 bit outputs being connected to another of said first decoders, each of said first decoders having 16 outputs.

11. A telecommunications system according to claim 10 wherein each of 15 outputs of each of said first decoders is connected to a relay for connecting 15 links to said MCA means.

12. A telecommunications system according to claim 11 wherein each of said 15 outputs is connected to a relay through a relay driver mounted on a circuit board with said first and second decoders and said latches.

13. A telecommunications system according to claim 12 wherein said circuit board includes thereon reset means for resetting all said relays responsive to san interruption of power to said MCA means.

14. A telecommunications systems according to claim 1 wherein said multiple links comprise ISDN lines.

15. A telecommunications system according to claim 1 wherein said multiple links comprise lines in a private line data network.

16. A telecommunications system according to claim 1 wherein said multiple links comprise lines in a data network.

17. In a telecommunications system including multiple links for transmitting data, remotely controllable Microprocessor Controlled Analyzer (MCA) means for analyzing said data, and multiple switch means associated with said links for connecting said links to said MCA means to effect monitoring of data carried by said links, the improvement comprising:

multiple first binary to decimal decoders each having a 4 bit input and 16 bit output;

each bit of said output being connected to one of said switch means to control the condition thereof;

a plurality of one byte input to one byte output latches, each having one nibble of said output connected to the 4 bit input of one of said binary to decimal decoders and another nibble of said output connected to another of said binary decoders;

means for connecting the inputs of said latches to a data bus in said MCA means;

an address decoder connected to an address bus in said MCA means and connected to control said latches in accordance with address data received from said MCA means; and binary input to binary output control latch means having a one byte input connected to said data bus in said MCA means for producing binary coded control output to control said MCA means.

18. A telecommunications system according to claim 17 wherein said address decoder is settable.

19. A telecommunications system according to claim 18 wherein said address decoder is manually settable.

20. A telecommunications system according to claim 17 wherein said switch means comprise relays and said first binary to decimal decoder outputs are connected to said relays through relay drivers.

21. A telecommunications system according to claim 20 wherein said relays are controlled by said first binary to decimal decoders to connect said links to said MCA means.

22. A telecommunications system according to claim 17 wherein each of said one byte input to one byte output latches is connected to said data bus through a one-way write only connection.

23. A telecommunications system according to claim 17 including reset means or resetting all said switch means responsive to an interruption of power to said MCA means.

24. A telecommunications system according to claim 17 wherein said multiple links comprise ISDN lines.

25. A telecommunications system according to claim 17 wherein said multiple links comprise lines in a data network.

* * * * *